United States Patent [19]
Roesch et al.

[11] 3,743,803
[45] July 3, 1973

[54] INERTIA SWITCH WITH OSCILLATING CONTROLLER RESTRAINED AGAINST RETURN TO NORMAL POSITION

[76] Inventors: Carol Roesch, 42 rue du Tir; Rene Heinimann, 6 Chemin du Wolfloch, both of Colmar, France

[22] Filed: Mar. 2, 1972

[21] Appl. No.: 231,180

[30] Foreign Application Priority Data
Mar. 9, 1971 France .............................. 7109016
Nov. 22, 1971 France .............................. 7142996

[52] U.S. Cl. ........................ 200/61.45 R, 200/61.5
[51] Int. Cl. .......................................... H01h 35/14
[58] Field of Search .................... 200/61.45 R–61.53

[56] References Cited
UNITED STATES PATENTS
2,236,872   4/1941   Grigsby ............................ 200/61.5
2,291,236   7/1942   Kilgour ........................... 200/61.5 X
2,912,534   11/1959  Rowell et al. ............. 200/61.45 R X
3,466,409   9/1969   Pernet ......................... 200/61.45 R Primary Examiner—J. R. Scott
Attorney—Irvin S. Thompson et al.

[57] ABSTRACT

The disclosure is of a circuit-breaker suitable for use in a vehicle and adapted to function automatically to interrupt the circuit from the battery of the vehicle if the latter suffers a shock or impact, the circuit-breaker comprising a sealed insulating housing in which is mounted an inertia weight which can be displaced by a horizontal shock force from any direction and thereby releases a conducting contact plate which is moved by springs so as to break the circuit.

6 Claims, 4 Drawing Figures

Patented July 3, 1973 3,743,803

INERTIA SWITCH WITH OSCILLATING CONTROLLER RESTRAINED AGAINST RETURN TO NORMAL POSITION

INTRODUCTION AND BACKGROUND OF THE INVENTION

The present invention relates to an automatic inertia electric circuit-breaker which upon the occurrence of a shock permits the instantaneous interruption of the electric current delivered by the battery of an automobile or any other vehicle equipped with a combustion engine.

The problem relating to the interruption of the electric current in the case of an accident with such a vehicle is always of major importance. The interruption of the current at the actual level of the battery avoids all risks of fire being able to be caused by a spark or a short-circuit of the electrical installation when there is a severe shock or overturning of the vehicle.

The majority of the known circuit-breakers are based upon the employment either of an inertia mass through which passes the electric current supplying the vehicle, or of an inertia mass in the form of a pendulum tumbler, or of an articulated weight comprising several pieces, or of a mercury circuit-breaker switch.

These various known circuit-breakers all present disadvantages which are not negligible. In practice the functioning of a circuit-breaker provided with an inertia mass traversed by the electric current is in danger of being impaired, notably because of the following facts: on the one hand, if the surface of the points of contact is sufficiently large to permit the passage of an electric current of substantial strength the friction is considerable, which necessitates a very violent shock in order to dislodge the inertia weight, and, on the other hand, if the points of contact are of small area, the passage of the current involves the danger of causing fusion of the metal.

Other disadvantages of the known circuit-breakers reside in that their large cumbersome size prevents them from being fixed directly upon one of the terminals of the battery, in the impossibility of resetting them after a shock, or in their net cost being very high.

In order to mitigate these disadvantages the present invention has as one object to provide an automatic inertia electric circuit-breaker with an absolute certainty of functioning, of small bulk, easy to mount upon the vehicle, and comprising an arrangement permitting instantaneous resetting after a shock.

BRIEF SUMMARY OF THE INVENTION

The circuit-breaker according to the invention is characterized in that it comprises a sealed housing, electrically insulating, in which is mounted an inertia weight which in the case of a shock in any horizontal direction is displaced by its inertia force and thus liberates a conductor plate which, impelled by springs, breaks the circuit.

FURTHER DESCRIPTION AND ADVANTAGES OF THE INVENTION

Being of small bulk, this circuit-breaker comprises an inlet terminal for fixing directly upon the terminal of the battery, and an outlet terminal for receiving the supply cable of the vehicle provided with its original connector thimble. The upper part of the circuit-breaker comprises a knob permitting its resetting.

This circuit-breaker constructed thus effects the isolation of the battery in the event of a shock to the vehicle, but, on the contrary, does not ensure the earthing of the electrical circuitry of the said vehicle.

On the other hand, it may be useful and especially in certain instances, such as a prolonged period of non-utilization of the vehicle, rendering it desirable to disconnect the battery for reasons of security.

With this object and in a manner to interrupt completely the production of electricity by the generator and to neutralise instantaneously the high voltage current supplying the illuminating lamps, it is provided, in conformity with a further feature of the invention, that a circuit-breaker analogous to that described above comprises moreover, on the one hand, two contacts coming into co-operation with the conducting plate in the event of a shock to the vehicle, one of these contacts being integral with the outlet terminal of the circuit-breaker fixed upon one of the terminals of the battery, while the other contact is connected, by means of a conducting wire, to the other terminal of the battery, and, on the other hand, a manual interruption system characterized in that there is provided below the resetting knob an arrangement for maintaining this knob in a raised position, thus interrupting the current.

In conformity with a feature of the invention the manual displacement of the resetting knob can be obtained from a distance by means of a control cable in a sheath or by means of a hydraulic system, controlled, for example, by means of a removable contact key.

The invention will be better understood with the assistance of the following description and the accompanying drawings which show two forms of embodiment, given by way of non-limitative example, of the device forming the subject of the present invention.

BRIEF DESCRIPTION OF THE VIEWS IN THE DRAWINGS

Figure 1:
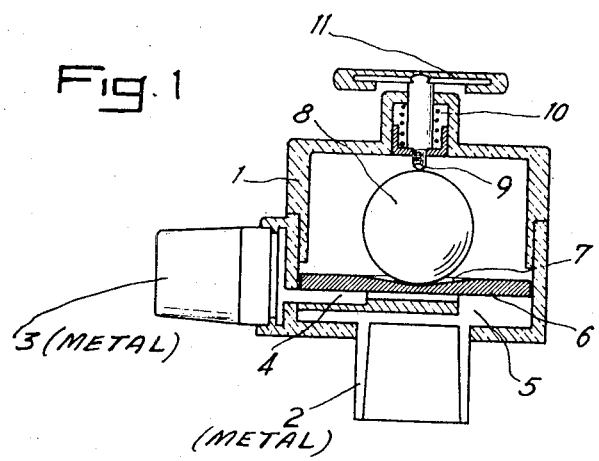
FIG. 1 is a view in section of a first form of embodiment of the device in the set position.
Figure 2:
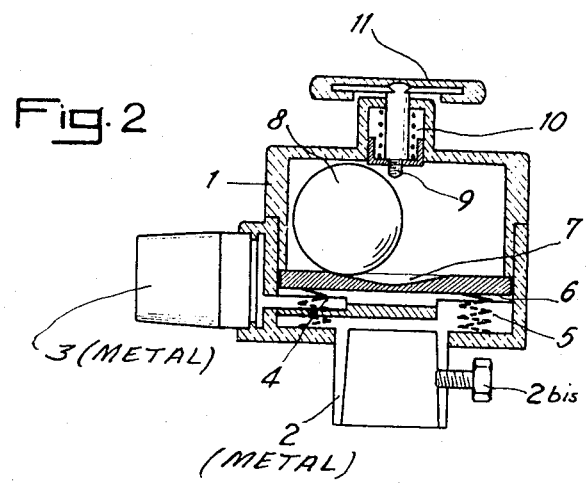
FIG. 2 is a similar view, in the position after a shock.

Thus, as represented in FIGS. 1 and 2, in a first form of embodiment, the device which is the subject of the invention is constituted essentially by a sealed housing 1 of electically insulating material carrying two terminals 2 and 3 unified by surrounding casting with the housing. The terminal 2 matching the terminal of the battery is fixed on the latter directly by a simple set-screw 2 bis. The outlet terminal 3, having the same form as that of the battery, permits the removal and attachment of the supply cable of the vehicle provided with its original connection thimble. These two terminals have in the interior of the housing two contact lugs 4 and 5 of large surface area permitting the passage of substantial currents. A conducting plate 6 of circular form connects the two lugs 4 and 5. On its upper surface this plate 6 has a conical concavity 7 of very large angle of which the centre serves as a seat for a spherical inertia mass 8 pressed thereon by a presser 9 with a rounded head loaded by a spring 10. In the event of shock the inertia mass 8 leaves its seat because of its inertia and thus liberates the conducting plate 6, which, impelled by insulated or non-conductive springs, breaks the circuit. The force necessary for the displacement of the inertia mass 8 is determined by the angle of the concave seat 7 for the mass 8, by the sliding coefficient of friction of the head of the presser 9 on the mass, and by the pressure exerted by the spring 10. The exact value of these three factors makes it possible, moreover, to define the sensitivity of the disengagement arrangement, this being regulated in a manner such that it corresponds preferably to a deceleration between 4g and 6g. FIG. 2 represents the circuit-breaker after a shock, the inertia mass 8 being maintained displaced from the axis of the housing 1 by the presser 9. Upon pulling of the knob 11 upwardly the presser 9 liberates the mass 8, which by the force of gravity resumes its position upon its seat 7. Upon releasing the knob 11 the conducting plate 6 is again pressed upon the two lugs 4 and 5 by means of the presser and of the mass 8, and thus the circuit-breaker is reset.

Figure 3:
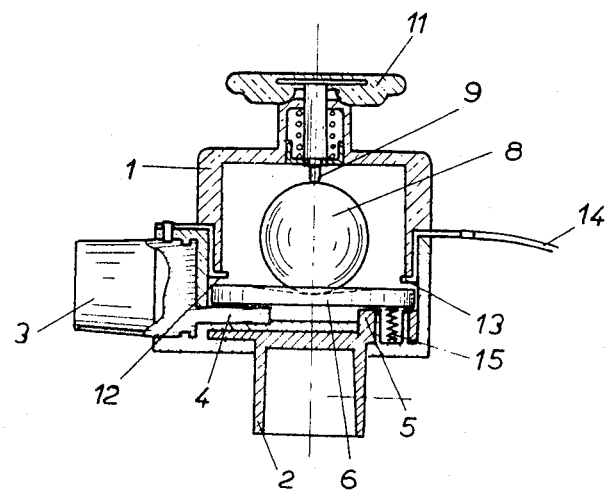
FIG. 3 is a view in section of a second form of embodiment of the device.

In the form of embodiment represented in FIG. 3 the circuit-breaker comprises, in addition, two contacts 12 and 13.

Whilst the contact 12 is integral with the terminal 3 receiving the "earth" cable, the contact 13 is connected, by means of a conducting wire 14, to the connection thimble fixed upon the other terminal of the battery.

The circuit-breaker may be mounted, for example, upon or connected to the positive terminal of the battery, and the conducting wire 14 may be connected to the negative terminal of this battery, the reverse arrangement being equally possible.

The circuit-breaker which is the subject of this second form of embodiment functions in the following manner:

In the event of shock to the vehicle the inertia mass 8, normally maintained between the conducting plate 6 and the head of the presser 9, is displaced under the effect of the force of inertia and thus liberates the plate 6 which, under the action of the springs 15 interposed between the base of the housing 1 of the circuit-breaker and the plate 6, leaves the two lugs 4 and 5 and simultaneously abuts against the contact 12 and 13. In this way the assembly of the electrical circuity of the vehicle is connected to the "earth" by means of the contact 12, the conducting plate 6, the contact 13, and the conducting wire 14.

According to a further feature of the invention there is provided, below the resetting knob 11, an arrangement for maintaining this knob in a raised position, that is to say in a position for freeing the conducting plate 6.

Figure 4:
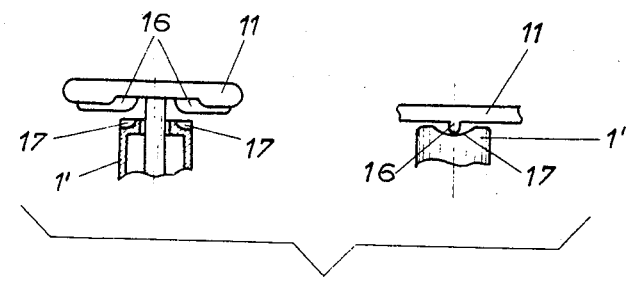
FIG. 4 shows, in two partial views, the arrangement for holding up the resetting knob.

This arrangement is constituted, for example, as shown in FIG. 4 by two diametrically opposed projections 16 engaged in two complementary grooves 17 of the part 1' of the circuit-breaker. These grooves 17 have a very much widened section in order to permit by a rotation, in one direction or in the other, of the knob 11, the causing of the sliding of the projections 16 out of the grooves 17.

Thus it is possible, by placing the knob 11 in the raised position, either manually by direct action upon the knob or by remote action through the intermediary of a control cable with a sheath connected to a handle, or hydraulically or in any other manner, for example by means of a contact key, to completely interrupt the electrical circuit of the vehicle, the device in this instance being equally capable of serving as an anti-theft device.

The device which is the subject of the invention can be utilised on all vehicles equipped with combustion engines.

What is claimed is :

1. An automatic inertia electric circuit breaker permitting the passage of a substantial amount of current and adapted in the event of an accident to put out of circuit the whole electrical installation of a vehicle equipped with a combustion engine, comprising a sealed electrically insulating housing, a sphere adapted to roll in said housing and constituting an inertia mass which moves under the impetus of a horizontal shock from any horizontal direction, a conducting plate on which said sphere rolls, a shallow recess in the upper surface of said conducting plate, said sphere adapted to roll by gravity to the center of said recess , a presser having a convex rounded head of relatively small diameter, spring means urging said presser against said sphere in the direction of said center of said sphere when said sphere is at said center of said recess thereby releasably to retain said sphere in said recess, said circuit-breaker having fixed contact means adapted to be bridged by said conductive plate, contact terminal means configuratively connected to a terminal of said battery of said vehicle and the supply cable of said vehicle, and a manually operable resetting knob disposed outside said housing and manipulable to raise said presser to permit said sphere to roll by gravity to said center of said recess.

2. A circuit-breaker as claimed in claim 1, in which said fixed contact means comprises two supplementary contacts between which said conducting plate comes into abutment in the event of a shock or of the raising of said resetting knob, one of these said supplementary contacts being integral with a terminal and mounted upon or connected to one of the terminals of said battery, the other said supplementary contact being connected to said other terminal of said battery.

3. A circuit-breaker as claimed in claim 1, characterized in that there is provided below said resetting knob an arrangement adapted to maintain said knob in a raised position in which said conducting plate of said circuit-breaker is maintained at a distance from said fixed contact means and interrupts the circuit.

4. A circuit-breaker as claimed in claim 3, characterized in that the arrangement for maintaining said resetting knob in the raised position comprises two diametrically-opposed resetting knob projections capable of being engaged in two external housing grooves complementary thereto or disengaged from said grooves by rotation of said knob.

5. A circuit-breaker as claimed in claim 4, characterised in that the section of said grooves adapted to receive said projections is broadly widened, whereby rotation of said resetting knob moves the knob axially.

6. A circuit-breaker as claimed in claim 1, said recess having side walls disposed at an angle of 160° to 177° to each other.

* * * * *